US010565966B2

(12) United States Patent
Bogusz et al.

(10) Patent No.: US 10,565,966 B2
(45) Date of Patent: Feb. 18, 2020

(54) DISPLAY CONTROLLERS

(71) Applicant: ARM Limited, Cambridge (GB)

(72) Inventors: Michal Karol Bogusz, Cambridge (GB); Piotr Tadeusz Chrobak, Cambridge (GB)

(73) Assignee: Arm Limited, Cambridge (GB)

( * ) Notice: Subject to any disclaimer, the term of this patent is extended or adjusted under 35 U.S.C. 154(b) by 193 days.

(21) Appl. No.: 15/287,492

(22) Filed: Oct. 6, 2016

(65) Prior Publication Data

US 2018/0101928 A1 Apr. 12, 2018

(51) Int. Cl.
*G06T 1/20* (2006.01)
*G06T 1/60* (2006.01)
*G09G 5/397* (2006.01)

(52) U.S. Cl.
CPC .................................. *G09G 5/397* (2013.01)

(58) Field of Classification Search
CPC ........................................................ G06T 3/40
USPC ........................................................ 345/629
See application file for complete search history.

(56) References Cited

U.S. PATENT DOCUMENTS

| | | | | |
|---|---|---|---|---|
| 5,790,708 A * | 8/1998 | Delean | ..................... | G06T 3/00 345/428 |
| 6,222,947 B1 * | 4/2001 | Koba | ..................... | G06T 11/60 358/302 |
| 9,519,972 B2 * | 12/2016 | Venkataraman | ........ | G06T 7/557 |
| 2001/0004810 A1 * | 6/2001 | Tasaki | .................... | B42D 25/42 40/1 |
| 2003/0035591 A1 * | 2/2003 | Crabtree | .................. | G06T 11/60 382/254 |
| 2004/0057600 A1 * | 3/2004 | Niwa | .................... | B60R 25/104 382/103 |
| 2008/0187242 A1 * | 8/2008 | Kondo | .................. | G06K 9/3275 382/289 |
| 2010/0277665 A1 * | 11/2010 | Kuo | ..................... | G02F 1/13336 349/58 |
| 2012/0002082 A1 * | 1/2012 | Johnson | .................... | G06T 5/50 348/234 |
| 2012/0094737 A1 * | 4/2012 | Barclay | ............... | G07F 17/3213 463/20 |
| 2015/0010214 A1 * | 1/2015 | Ishizawa | ................... | G06T 7/73 382/106 |
| 2015/0133215 A1 * | 5/2015 | Heinz, II | ................. | D06B 1/00 463/31 |

(Continued)

OTHER PUBLICATIONS

"Image Alignment and Stitching" Richard Szeliski, Handbook of Mathematical Models in Computer Vision, pp. 273-292, Springer, 2005.*

(Continued)

*Primary Examiner* — Javid A Amini
(74) *Attorney, Agent, or Firm* — Vierra Magen Marcus LLP

(57) ABSTRACT

In a display controller of a data processing system, when composing two or more input surfaces to generate a composited surface comprising the two or more input surfaces, data indicating a border between different input surfaces in the composited surface is associated with the composited surface. The data indicative of the border between two input surfaces in the composited surface is then used to control subsequent processing, such as compression and/or filtering, of the composited surface.

21 Claims, 12 Drawing Sheets example (A)

example (B)

(56) References Cited

U.S. PATENT DOCUMENTS

2016/0021303 A1* 1/2016 Sutton ................ H04N 5/2257
                                                              348/222.1

OTHER PUBLICATIONS

Virtual Bellows: Constructing High Quality Stills From Video, S. Mann and R. W. Picard, 1994.*
Real-time construction and visualisation of drift-free video mosaics from unconstrained camera motion, Mateusz Brzeszcz, Toby P. Breckon, Published in the Journal of Engineering.*

* cited by examiner

DISPLAY CONTROLLERS

BACKGROUND

The technology described herein relates to data processing systems and in particular to display controllers for data processing systems.

FIG. 1 shows an exemplary data processing system that comprises a central processing unit (CPU) 7, a graphics processing unit (GPU) 2, a video codec 1, a display controller 30, and a memory controller 8. As shown in FIG. 1, these units communicate via an interconnect 9 and have access to off-chip memory 3.

In use of this system, the GPU 2, video codec 1 and/or CPU 7 will, for example, generate surfaces (images) to be displayed and store them, via the memory controller 8, in respective frame buffers in the off-chip memory 3. The display controller will, for example, then read those surfaces as input layers from the frame buffers in the off-chip memory 3 via the memory controller 8, process the input surfaces appropriately and send them to a display 4 for display.

FIG. 2 shows an exemplary data path for the input surfaces for display in the display controller 30. It is assumed in this example that the display controller 30 can take as inputs for a given output surface to be displayed, a plurality of input surfaces (layers), and includes, inter alia, a composition engine (stage) 22 that is able to compose one or more input surfaces (layers) (e.g. generated by the GPU 2 and/or video codec 1) to provide a composited surface (frame) for display.

As shown in FIG. 2, the display controller 30 includes a DMA (Direct Memory Access) read unit 20 that reads data of input surfaces to be displayed and provides that data appropriately to respective layer processing pipelines 21 that perform appropriate operations on the received input surfaces before they are provided to the display composition stage 22, where they are composited into the desired composited surface for display.

The composited surface may be subjected to display timing control (e.g. the inclusion of appropriate horizontal and vertical blanking periods), and then provided to the display output interface of the display controller 30 for provision to the display 4 for display.

This process is performed for each frame that needs to be displayed, e.g. at a rate of 30 or 60 frames per second.

As shown in FIG. 2, the composited surface from the display compositor 22 may be subject to further processing before it is, e.g., displayed, in image processing stages (blocks) 23, 24, 25 and 26. These image processing stages may perform a variety of different image processing operations on the composited surface, such as, for example, scaling, sharpening, high dynamic range imaging (HDR), colour adjustment, brightness enhancement functions, other image quality enhancement functions and compression of the composited surface.

As shown in FIG. 2, these subsequent image processing stages may be internal to the display controller 30 as in the case of stages (blocks) 23, 25, or they may be connected to the display controller processing pipeline through special display controller interfaces as in the case of the image processing stage 24, or they may be outside the display controller itself and perform processing on an output data stream from the display controller 30 as in the case of the image processing stage 26, etc.

It would also be possible, for example, for the composited surface to be passed to an image processing stage via external memory (i.e. by writing the composited surface to external memory from where it is then read and processed).

Other arrangements would, of course, be possible.

Many of these image processing operations that may be performed on a composited surface that is to be displayed may use operations (so-called "window" operations) that use several input data positions (pixel positions) in the composited surface in order to determine the value of a given output data position (pixel) in the processed composited surface that is the output of the image processing operation. For example, an image processing operation may perform a filtering operation using a 3×3 pixel window to produce an output pixel value.

The Applicants have recognised that where image processing operations use plural input pixels to derive an output pixel value, then that can lead to errors around the borders between different input surfaces (layers) in a composited surface, because in those regions of the composited surface, the image processing function (e.g. 3×3 filter window) may take data positions (pixels) from different input surfaces (layers). This can then introduce "blur" between the different input surfaces (layers) of the composited surface after the image processing, because of "bleeding" of colours from one surface (layer) to another.

FIG. 3 illustrates this and shows an example composited surface 40 that is composited from two input surfaces (layers) 41, 42. As shown in FIG. 3, a 3×3 filtering window 43 is then applied to the composited surface 40 to produce a filtered version 44 of the composited surface 40. As shown in FIG. 3, the rows 45 at the boundary between the input layers 41 and 42 in the composited surface 40 are blurred, because of "bleeding" of colours from one layer to the other layer when the 3×3 filtering window 43 was applied to the composited surface 40.

The Applicants believe that there remains scope for improvements to the operation of display controllers that composite input surface (layers) to provide a composited surface, and in particular for arrangements that reduce or avoid blurring when performing processing operations on a surface composited from two or more input surfaces (layers).

BRIEF DESCRIPTION OF THE DRAWINGS

Various embodiments of the technology described herein will now be described by way of example only and with reference to the accompanying drawings, in which.

Like reference numerals are used for like components throughout the drawings, where appropriate.

DETAILED DESCRIPTION

Figure 1:
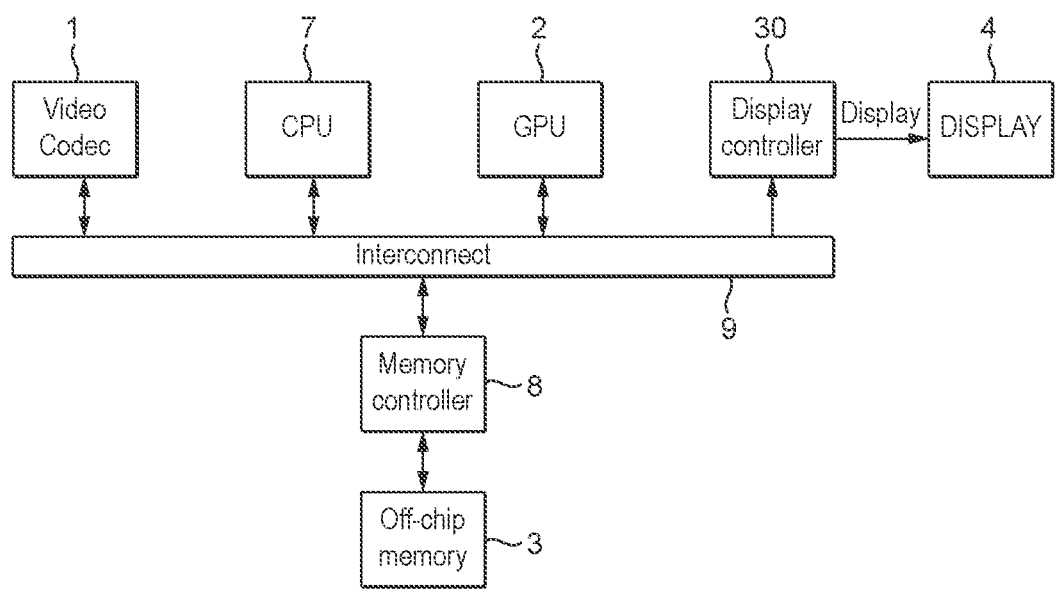
FIG. 1 shows an exemplary data processing system.

A first embodiment of the technology described herein comprises a method of operating a data processing system, the data processing system comprising:
 a display controller, the display controller comprising:
  an input stage operable to read plural input surfaces;
  a composition stage operable to compose two or more read input surfaces to generate a composited surface comprising the two or more input surfaces; and
  an output stage operable to provide an output surface for display to a display; and
 the data processing system further comprising:
  an image processing stage operable to perform a processing operation on a composited surface generated by the composition stage;
 the method comprising:
  when generating a composited surface comprising two or more input surfaces:
   associating with the composited surface, data indicating a border between different input surfaces in the composited surface; and
   the image processing stage processing the composited surface and, when processing the composited surface, using the information indicative of the border between two input surfaces in the composited surface to control the processing of the composited surface by the image processing stage.

A second embodiment of the technology described herein comprises a data processing system comprising:
 a display controller, the display controller comprising:
  an input stage operable to read plural input surfaces;
  a composition stage operable to compose two or more read input surfaces to generate a composited surface comprising the two or more input surfaces; and
  an output stage operable to provide an output surface for display to a display;
 and the data processing system further comprising:
  an image processing stage operable to perform a processing operation on a composited surface generated by the composition stage;
 wherein:
  the display controller further comprises processing circuitry configured to, when the display controller is generating a composited surface comprising two or more input surfaces, associate with the composited surface, data indicating a border between different input surfaces in the composited surface; and
  the image processing stage comprises processing circuitry operable to, when the image processing stage is processing a composited surface, use information indicative of a border between two input surfaces in a composited surface to control the processing of the composited surface by the image processing stage.

The technology described herein relates to display controller operation where an output surface composited from two or more input surfaces is subjected to a subsequent processing operation.

In the technology described herein, in addition to generating the composited surface from the two or more input surfaces, information indicative of a border between at least two of the input surfaces in the composited surface is generated and associated with the composited surface. That "border" information is then used when processing the composited surface to control the processing of the composited surface (e.g., and in an embodiment, and as will be discussed further below, to select the data positions in the composited surface to use when performing a processing operation that takes plural composited surface data positions to produce an output processed composited surface data position for at least some of the data positions in the processed composited output surface).

As will be discussed further below, this can be, and is in an embodiment, used to identify those data (pixel) positions in the composited surface that lie at the borders between input surfaces, and to then select input data (pixel) position values for the processing operation from data (pixel) positions in the appropriate input surface only.

As will be discussed further below, these arrangements can then have the effect of reducing or avoiding blur at the borders between input surfaces in a composited surface when subjecting that composited surface to further processing operations, but without the need, e.g., to perform complex edge detection processes, such as by using edge detection algorithms, over the composited surface.

The input stage of the display controller may comprise any suitable stage operable to read at least one input surface. It in an embodiment comprises a memory read sub-system operable to read data of input surfaces to be processed by the display controller. The memory read subsystem can function as desired and include any suitable and desired elements and components of such subsystems, such as, for example, and in an embodiment, appropriate local latency hiding buffers, a Direct Memory Access (DMA) read controller, etc.

Each input surface read by the display controller (that is used as an input layer by the display controller) may be any suitable and desired such surface, such as, and in an embodiment, an image, e.g. frame, for display. The input surfaces (and the composited surface and any other surface) will each comprise an array of data positions (pixels), each having an associated data value or values (e.g. a colour value or values).

The input surfaces can be generated as desired. For example the one or more input surfaces may be generated by being appropriately rendered and stored into a memory (e.g. frame buffer) by a graphics processor. Additionally or alternatively, one or more input surfaces may be generated by being appropriately decoded and stored into a memory (e.g. frame buffer) by a video codec. Additionally or alternatively, one or more input surfaces may be generated by a digital camera image signal processor (ISP), or other image processor. The input surface or surfaces may be, e.g., for a game, a demo, a graphical user interface (GUI), a GUI with video data (e.g. a video frame with graphics "play back" and "pause" icons), etc.

In an embodiment, the input surface or surfaces are read from a memory in which the input surface or surfaces is stored. The memory may comprise any suitable memory and may be configured in any suitable and desired manner. For example, it may be a memory that is on-chip in the display controller or it may be an external memory. In an embodiment it is an external memory, such as a main memory of the overall data processing system. It may be dedicated memory for this purpose or it may be part of a memory that is used for other data as well. In an embodiment each input surface is stored in (and read from) a frame buffer.

The composition stage is operable to compose (two or more) input surfaces to generate a composited surface. The composition process can compose the input surfaces to generate a composited surface in any suitable and desired manner, for example by blending or otherwise combining the input surfaces to generate a composited surface. The composited surface may include only some of, or all of, each input surface, e.g. depending upon whether and how the input surfaces overlap in the composited surface.

The display controller may also be operable (include a processing stage(s) operable to) to decode (e.g. decompress) an input surface, e.g. to generate one or more decoded (e.g. decompressed) input surfaces, to rotate an input surface, e.g. to generate one or more rotated input surfaces, and/or to scale (e.g. upscale and/or downscale) one or more surfaces, e.g. to generate one or more scaled surfaces. The "scaled" surface(s) may be an input surface or surfaces and/or the composited surface.

The display controller may also be operable to (include a processing stage(s) operable to) encode (e.g. compress) one or more surfaces, e.g. to generate one or more compressed surfaces. This compression stage may be operable to compress any one, some or all of the input surface(s) and/or an (e.g. composited) output surface.

The display controller may further comprise one or more layer pipelines operable to perform one or more processing operations on one or more input surfaces, as appropriate, e.g. before providing the one or more processed input surfaces to a scaling stage and/or composition stage, or otherwise. Where the display controller can handle plural input layers, there may be plural layer pipelines, such as a video layer pipeline or pipelines, a graphics layer pipeline, etc. These layer pipelines may be operable, for example, to provide pixel processing functions such as pixel unpacking, colour conversion, (inverse) gamma correction, and the like.

The display controller may also include a post-processing pipeline operable to perform one or more processing operations on one or more surfaces, e.g. to generate a post-processed surface. This post-processing may comprise, for example, colour conversion, dithering, and/or gamma correction.

The output stage of the display controller of the technology described herein may be any suitable output stage operable to provide an output surface for display to a display, e.g. to cause the output surface for display to be displayed on the display. The output stage in an embodiment comprises a display processing pipeline that performs the necessary display processing operations on the output surface to be displayed. The output stage in an embodiment comprises appropriate timing control functionality (e.g. it is configured to send pixel data to the display with appropriate horizontal and vertical blanking periods) for the display. The output stage may also make use of (take inputs from) (external) processing blocks (stages) that are connected to the display controller, e.g. via direct data interfaces, if desired.

The output stage is in an embodiment operable to receive the output surface for display before providing it to the display, and in an embodiment directly from within the display controller, i.e. without the output surface for display being output from the display controller and stored in external memory.

The output surface should be and in an embodiment is (at least based on) a composited surface generated by the composition stage. In an embodiment the output surface is an (optionally compressed) composited surface generated by the composition stage, or an (optionally compressed) post-processed composited surface. The output surface is in an embodiment an image for display.

The display that the display controller of the technology described herein is used with may be any suitable and desired display, such as for example, a screen. It may comprise the overall data processing system's (device's) local display (screen) and/or an external display. There may be more than one display output, if desired.

In an embodiment, the display controller further comprises a write-out stage that can write a surface to external memory. The surface may, e.g., be a surface generated by any desired element (stage) of the overall display controller, such as a composited surface or a single (e.g. input) surface. This write-out stage in an embodiment comprises a local buffer operable to receive and store data for a surface to be written to external memory, and/or appropriate write-out logic, such as, and in an embodiment, a write controller, such as a Direct Memory Access (DMA) write controller.

The external memory that the write-out stage writes the surface to should be and is in an embodiment one or more memories external to the display controller. The external memory is in an embodiment provided as or on a separate chip (monolithic integrated circuit) to the display controller. The external memory in an embodiment comprises a main memory (e.g. that is shared with the Central Processing Unit (CPU)), of the overall data processing system. In an embodiment the surface is written to a frame buffer in the external memory.

The image processing stage that processes the composited surface from the composition stage can be any suitable and desired image processing stage (perform any suitable and desired image processing operation on the composited surface). In an embodiment it performs one or more of: scaling, sharpening, high dynamic range imaging, colour adjustment, brightness enhancement functions, image quality enhancement functions, and compression of the composited output surface.

The image processing stage may perform one function only, or it may be operable to perform a number of different operations on the composited surface, e.g. in succession or in parallel.

There may also be more than one image processing stage that is operable to process the composited surface, e.g. in turn. In this case each image processing stage may perform a different image processing operation, for example. In an embodiment where there are plural image processing stages after the composition stage, then in an embodiment plural and in an embodiment each, of those image processing stages can use the border information associated with the composited surface and operate in the manner of the technology described herein.

The image processing stage or stages may be part of the display controller (and in an embodiment the or at least one of the image processing stages is part of the display controller), or they may be external to the display controller. Correspondingly, the image processing stages may receive a composited surface directly, e.g. from the composition stage or another image processing stage, or they may receive the composited surface via memory (via the composited surface first being stored in memory). Correspondingly, an image processing stage may process a composited surface as it is generated by the composition stage, or may process a "processed" form of the composited surface (e.g. that has already been subjected to some processing by another image processing stage). In both cases, the image processing stage may, and in an embodiment does, use the border indicating data for the (e.g. processed) composited surface to control its processing of the (e.g. processed) composited surface.

The image processing operation in an embodiment derives an output array of data (pixel) position values for the composited surface, e.g., and in an embodiment, corresponding to some, and in an embodiment all, of the data (pixel) positions for the composited surface.

The image processing operation may derive the one or more output values from the composited surface data (pixel) position values in any desired and suitable way.

In an embodiment, the image processing operation uses a set (kernel) of data (pixel) position value (a two-dimensional processing "window") from the composited surface to derive an (and each) output position (pixel) value. The set of data (pixel) position values (the processing window) that is used in an embodiment comprises an array of data composited surface position values (e.g. a 3×3 array of data (pixel) position values), that, in an embodiment, includes the data (pixel) position for which the output value is being generated.

Thus, in an embodiment, the image processing operation uses data (pixel) position values from a set of (plural) data (pixel) positions in the composited surface to generate an output value for a given data (pixel) position, and the data (pixel) position for which the output value is being generated is in an embodiment one of the data (pixel) positions in the set of data (pixel) positions that is being used to generate the output value. In an embodiment the set (kernel) of data (pixel) positions used to produce an output result for a given data (pixel) position surrounds the data (pixel) position in question (i.e. the data (pixel) position being processed may be at or towards the centre of the set of data (pixel) positions (processing window) being used).

The output of the image processing operation (the processed composited surface) may be used in any suitable and desired manner. For example, it may be subjected to further image processing (or other) operations. It is in an embodiment (ultimately) provided to a display for display (and displayed). In one embodiment, it is stored for later use, e.g. by being written out to external memory, for example, by the write out stage. It may also or instead be transmitted to a remote device, e.g. for display.

The various stages of the display controller, etc., may be implemented as desired, e.g. in the form of one or more fixed-function units (hardware) (circuitry) (i.e. that is dedicated to one or more functions that cannot be changed), or as one or more programmable processing stages, e.g. by means of programmable circuitry that can be programmed to perform the desired operation. There may be both fixed function and programmable stages.

One or more of the various stages of the display controller may be provided as separate circuit elements to one another. Additionally or alternatively, some or all of the stages may be at least partially formed of shared (processing) circuitry.

It would also be possible for the display controller to comprise, e.g., two display processing cores, each configured in the manner discussed above, if desired.

The identification of the border(s) between different input surfaces (layers) in the composited surface can be performed in any suitable and desired manner, and by any suitable and desired element (stage) of the display controller. This is in an embodiment done based on information, e.g., and in an embodiment, indicative of the size and/or position of the input surfaces in the composited surface, that is provided to the display controller, e.g., and in an embodiment, for the composition process (in contrast, e.g., to performing any post-processing (analysis) of the composited surface to identify borders in the composited surface).

In an embodiment the composition stage (the display compositor) identifies the border or borders between input surfaces, generates the information indicative of those borders, and associates that information with the composited surface. This is advantageous because the composition stage (the display compositor) will necessarily be provided with information about where the different input surfaces are to appear in the composited surface, such as information about the size and position of the input surfaces in the composited surface, and so will be able to use that information to determine where borders between different input surfaces in the composited surface are, without the need, e.g., to perform any form of additional edge detection process (algorithm). The composition stage should therefore be able to identify borders between input surfaces, without the need for complex processing of the composited surface.

It is also advantageous to use the composition stage for this process, as that will (normally) be the final stage in the display processing pipeline that will be made, as part of its normal processing operation, aware of the borders between the input surfaces (layers) in the composited surface (as after the composition stage, in normal operation the composited surface is then treated as a single surface, and so absent the operation in the manner of the technology described herein, any information indicative of borders between input surfaces in the composited surface would not be provided to later processing stages of the display processing pipeline).

The information indicative of the border(s) between input surfaces in the composited surface can take any suitable and desired form that can be used to determine where a border between two input surfaces is present in the composited surface.

In an embodiment, this information takes the form of a border (edge) indicator provided for data positions (pixels) in the composited surface that lie along the border (the edge) between the input surfaces (layers) in question. Thus, appropriate border (edge) indication information is in an embodiment provided for those data positions (pixels) that lie along a border between the input surfaces in question, but there will be no border (edge) indication (indicators) set for those composited surface data positions (pixels) that lie within the interior (not at the edge) of an input surface (layer).

In an embodiment, for plural, and in an embodiment for each, composited surface data (pixel) position, there is a corresponding associated border (edge) information indicator, that indicates whether that data position (pixel) is to be treated as lying at the border of an input surface (layer) or not.

While it would be possible simply to have an indication that a data position (pixel) lies at the border (edge) of an input surface (layer), in an embodiment, the border (edge) indication information is indicative of which edge or edges of the input surface (layer) in question the data position (pixel) is at. In an embodiment it can be indicated whether the data position (pixel) is along the top, left, right or bottom edge of the input surface (layer) in question. In an embodiment it can be indicated that a data position (pixel) is at more than one edge of an input surface (where that is the case, e.g. at a corner of an input surface). For example, each data position (pixel) in the composited surface could be, and in an embodiment is, associated with an appropriate bit mask (e.g. a 4-bit bit mask) that can be used to indicate which edge or edges that data (pixel) position lies at (along) (and whether it lies along any edges at all).

Other arrangements would, of course, be possible.

The input surface border indicating information can be associated with and provided with the composited surface in any suitable and desired manner. For example, this could be provided as an addition data array containing the border information for each data position (pixel) in the composited surface, that is provided (e.g. streamed) alongside the composited surface to later stages of the display processing pipeline.

Correspondingly, where the composited surface is to be written to external memory, then in an embodiment the corresponding input surface border information (e.g. data array) is also written out to external memory, in association with the composited surface.

While it would be possible to identify and generate border indicating information for each and every border between input surfaces in the composited surface, in an embodiment, only those borders between particular, and in an embodiment selected, input surfaces in the composited surface are identified and corresponding border information generated therefor. Thus, in some embodiments, border information may be generated for only some but not all of the borders between input surfaces in the composited surface.

In an embodiment, the input surface border identification and information generation takes account of (is based on) the transparency of the respective input surfaces (layers) in the composited surface, and in particular, and in an embodiment, of any alpha (transparency) blending that exists between the input surfaces (layers) in the composited surface.

In an embodiment, only the borders of the most visible input surface (layer) for any given region of the composited surface are identified and corresponding border indicating information stored therefor. Correspondingly, any borders between input surfaces (layers) that are covered by a more visible input surface (layer) are ignored and do not have border indicating information associated with them. This will then have the effect that the subsequent processing of the composited surface for the most visible (and thus the most important input surface) in any given part of the composited surface will not be distorted by the effect of any borders between less visible input surfaces in that particular part of the composited surface.

The Applicants have recognised in this regard that the borders between some input surfaces may in fact be covered by a further input surface which is more visible. In order therefore to avoid any distortion caused by an underlying border in a more visible input surface, in an embodiment only those borders of the more, and in an embodiment most, visible input surfaces in any given region of the composited output surface are identified and have corresponding border indicating data associated with them.

The most visible input surface (layer) in any given part (region) of the composited surface can be identified in any suitable and desired manner. It is in an embodiment identified based on the relative transparencies (alpha values) for the input surfaces that are present in the region of the composited surface in question. In one embodiment, the least transparent input surface (i.e. the input surface having the highest alpha value where a higher alpha value indicates less transparency) is determined to be the most visible surface at a given data position (pixel) in the composited surface, and for which accordingly the border is identified (i.e. it is determined whether that data position (pixel) lies at a border of its input surface or not).

Thus, in an embodiment, the transparency of each input surface that is present at a given data position (pixel) in the composited surface is considered, and, in an embodiment, the input surface having the least transparency (e.g. highest alpha value) at that data position (pixel) is then considered to be the input surface for which it is then determined whether the data position (pixel position) lies at the edge of that input surface or not.

In an embodiment, it is determined for a (and in an embodiment for each of plural, and in an embodiment for each) data (pixel) position in the composited surface, which input surface provides the biggest contribution (weight) to the composited data position (pixel) in the composited surface, and then that identified input surface is considered to be the most visible input surface at that data position (pixel) (for the purposes of the border (edge) determination and border indicating information). This is in an embodiment done based on the transparency (alpha) values for the input surfaces in question at the data position (pixel position) in question, and in an embodiment based on the effective alpha (transparency) value for each input surface at the data (pixel) position in question.

Thus, in an embodiment, where there is only a single input surface (layer) present at a given data position (pixel) in the composited surface, then it will be determined whether that data position (pixel) is at an edge of that input surface or not. However, where there are plural input surfaces (layers) present at a given data position (pixel) in the composited surface, then one of those plural input surfaces (layers) will be identified as the input surface (layer) to consider for the purposes of the border (edge) information at that data position (pixel) in the composited surface, in an embodiment based on the relative transparencies (alpha values) for the plural input surfaces (layers), and in an embodiment to identify the most visible input surface (layer).

This will then have the effect that the subsequent image processing operations on the composited surface should be operable to process the most visible surface (layer) at any given region of the composited surface correctly, thereby providing better quality for that more visible input surface (layer) in the composited surface, and, e.g., without the need to record border indicating information for all borders between input surfaces (layers) (e.g. for those borders between input surfaces (layers) that will not in practice be seen in the composited surface), and without needing to perform more complex processing to identify whether an indicated border may in fact be concealed by other input surfaces (layers) in the composited surface or not.

Thus, in an embodiment, the method of the technology described herein comprises (and the processing circuitry of the display controller is configured to): for a (and in an embodiment for each of plural, and in an embodiment for each) data (pixel) position in the composited surface, determining which input surface provides the biggest contribution to the composited data (pixel) position in the composited surface (in an embodiment based, at least in part, on the alpha (transparency) values for each input surface that is present at the data (pixel) position in the composited surface), and then determining whether the data (pixel) position in the composited surface lies along an edge of the determined input surface or not, and associating with the data (pixel) position in the composited surface, border (edge) indication information indicating whether the data (pixel) position lies at the edge of the determined input surface or not (and in an embodiment which edge or edges (if any) the data (pixel) position lies at).

This is in an embodiment repeated for each data (pixel) position in the composited surface.

The image processing stage can use the associated border indicating information for the composited surface to control its processing of the composited surface in any suitable and desired manner.

In an embodiment, this is done so as to select those data positions (pixels) in the composited surface that are subjected to the image processing operation for a given output data position (pixel). Thus, in an embodiment, the border indicating information is used to select the data positions in the composited surface being processed to be used to generate a data value for a data position in the processed composited output surface. This is in an embodiment done for one or more data positions in the processed composited surface.

In particular, where the image processing operation takes plural input data positions (pixels) to produce a given output data position (pixel) value, then it is in an embodiment determined whether any of the input data positions (pixels) to the image processing operation for the output data position (pixel) are indicated as being at the border (edge) of an input surface in the composited surface or not. If none of the input data positions (pixels) (in the processing window) are indicated as being at the edge (border) of an input surface, then the image processing operation is in an embodiment performed using the input data positions (pixels) (processing window) in the normal manner. However, if any one (one or more) of the input data positions (pixels) are indicated as being at the edge (border) of an input surface, then in an embodiment the set of input data positions (pixels) (the processing window) that is used for the image processing operation for the output data position (pixel) in question is modified, based on those input data positions (pixels) that are indicated as being at the edge (border) of an input surface.

In an embodiment the set (window) of input data positions (pixels) is modified in this situation so as to ensure that the only data positions (pixels) from the input surface (layer) that the output data (pixel) position falls within are used as inputs to the process for generating the output data position (pixel). This will then have the effect of avoiding data positions (pixels) coming from other input surfaces (layers) having an effect on the value for the output data position (pixel), thereby reducing or avoiding any "bleeding" and "blur" from other input surfaces (layers) at the boundary between two input surfaces (layers).

In an embodiment, the edge (border) indicating information is used to identify those input data (pixel) positions in the processing window that lie in a different input surface (layer) to the input surface (layer) that the data (pixel) position currently being processed lies within, and those data positions (pixels) that lie in a different input surface (layer) are, in an embodiment, then not used as inputs to the processing operation for the data position (pixel) in question. In an embodiment, where (potential) input data positions (pixels) are determined as being in a different input surface (layer), then those input data (pixel) positions are replaced with data position values (pixels) from the input surface (layer) that the data position (pixel) being processed belongs to, and in an embodiment by the data position (pixel) values for data positions (pixels) in the input surface (layer) that the data position (pixel) being processed belongs to that are closest to the data (pixel) positions that are in a different input surface (layer).

Thus, in an embodiment, the method of the technology described herein comprises the image processing stage (and image processing stage processing circuitry is configured to):

determining, using the border indication information associated with the composited surface whether any data (pixel) positions in a set of data (pixel) positions to be used to generate an output data (pixel) position value by the image processing operation lie in a different input surface in the composited surface to the input surface that the data (pixel) position for which the output is being generated lies in, and, when it is determined that the set of input (data) pixel positions includes a data (pixel) position that lies in a different input surface to the input surface that the data (pixel) position for which the output is being generated lies in, replacing the data value for that input data (pixel) position that lies in a different input surface, with a data value for a data (pixel) position from the input surface that the data (pixel) position for which the output is being generated lies in.

Thus, in an embodiment, the operation is so as to ensure that the modified set of input data positions (pixels) (the modified processing window) does not contain data positions (pixels) from more than one input surface.

Other, e.g. more sophisticated, modifications to the set of input data positions (pixels) (to the processing window) could be used if desired, for example in order to achieve desired effects, such as sharpening or smoothing around the edges of the input surfaces (layers).

While it would be possible for the border (edge) indicating information for a composited surface simply to be used by a single image processing stage and then discarded, in an embodiment, the border (edge) indicating data is propagated with a composited surface through plural image processing stages that are to process the composited surface (e.g. in turn), with some or all of those image processing stages then using the border indicating data appropriately to control their processing of the composited surface (of the version of the composited surface that they process (e.g. receive for processing)).

This then allows the border (edge) indicating data for a composited surface to be used by plural image processing stages to control their processing of the composited surface.

Thus, in an embodiment, the data processing system comprises plural image processing stages each operable to perform a processing operation on a composited surface, e.g. in turn, and the border (edge) indicating information associated with a composited surface is propagated to some, and in an embodiment all, of the plural image processing stages in association with the composited surface, with some or all of the image processing stages using the propagated border (edge) indicating information to control their processing of the composited surface.

Thus, in an embodiment, a processed composited surface is provided from a first image processing stage to a second image processing stage for processing by the second image processing stage, together with the data indicating a border between different input surfaces in the composited surface, and the second image processing stage processes the processed composited surface that it receives, and, when processing the composited surface, uses the information indicative of the border between two input surfaces in the composited surface to control the processing of the composited surface by the image processing stage. This may then be, and is in an embodiment, repeated for plural, and in an embodiment for each, image processing stage in the composited surface processing pipeline.

Correspondingly, in an embodiment, the composited surface is provided to plural image processing stages and subjected to plural image processing operations, and the border (edge) indicating data associated with the composited surface is provided to and propagated through the plural image processing stages that are to process the composited surface, with those image processing stages, in an embodiment, using the border (edge) indicating data to control their processing of the composited surface in the manner of the technology described herein.

Correspondingly, a or the image processing stage that uses the border (edge) indicating information for a composited surface need not necessarily be the first image processing stage that processes the composited surface after the composition stage, but may be a later image processing stage that processes (a previously processed) version of the composited surface, if desired. Equally, where there are plural image processing stages it would be possible for only one, or some but not all, or for all, of the image processing stages to use the border (edge) indicating information to control their processing, as desired (e.g., dependent upon the processing operations to be performed by the image processing stages).

The operation of the display controller, image processing stage(s), etc., in the manner of the technology described herein (and otherwise) can be controlled and configured as desired. For example, a driver or drivers for the display controller, etc., could instruct the display controller, etc., to operate in this manner.

Although the technology described herein has been described above with reference to the overall process of generating input surface border (edge) indicating information and then using that information when performing subsequent image processing on a composited surface, the technology described herein also extends to the process of generating the input border information for a composited surface on its own, and correspondingly to the use of such information when processing a composited surface on its own.

Thus, another embodiment of the technology described herein there is provided a method of operating a display controller of a data processing system, the display controller comprising:
  a display controller, the display controller comprising:
  an input stage operable to read plural input surfaces;
  a composition stage operable to compose two or more read input surfaces to generate a composited surface comprising the two or more input surfaces; and
  an output stage operable to provide an output surface for display to a display;
  the method comprising:
  the display controller, when generating a composited surface comprising two or more input surfaces:
  associating with the composited surface, data indicating a border between different input surfaces in the composited surface.

Another embodiment of the technology described herein comprises a display controller for a data processing system, the display controller comprising:
  an input stage operable to read plural input surfaces;
  a composition stage operable to compose two or more read input surfaces to generate a composited surface comprising the two or more input surfaces; and
  an output stage operable to provide an output surface for display to a display;
  wherein:
  the display controller further comprises processing circuitry configured to, when the display controller is generating a composited surface comprising two or more input surfaces:
  associate with the composited surface, data indicating a border between different input surfaces in the composited surface.

Another embodiment of the technology described herein comprises a method of operating an image processing stage of a data processing system, which image processing stage is operable to perform a processing operation on a composited surface generated from two or more input surfaces;
  the method comprising:
  the image processing stage when processing a composited surface, using information indicative of a border between two input surfaces in the composited surface to control the processing of the composited surface by the image processing stage.

Another embodiment of the technology described herein comprises an image processing stage of a data processing system, the image processing stage comprising:
  processing circuitry operable to perform a processing operation on a composited surface generated from two or more input surfaces; and
  processing circuitry operable to, when the image processing stage is processing a composited surface, use information indicative of a border between two input surfaces in a composited surface to control the processing of the composited surface by the image processing stage.

As will be appreciated by those skilled in the art, these embodiments of the technology described herein can, and in an embodiment do, include any one or more or all of the features of the technology described herein discussed herein, as appropriate.

In an embodiment, the display controller of the technology described herein forms part of a data processing system. Thus, another embodiment of the technology described herein comprises a data processing system comprising a display controller that is in accordance with the technology described herein.

The data processing system may and in an embodiment does also comprise one or more of, and in an embodiment all of: a central processing unit, a graphics processing unit, a video processor (codec), an image signal processor (ISP), a system bus, and a memory controller.

The display controller and/or data processing system may be, and in an embodiment is, configured to communicate with one or more of (and the technology described herein also extends to an arrangement comprising one or more of): an external memory (e.g. via the memory controller), one or more local displays, and/or one or more external displays. The external memory in an embodiment comprises a main memory (e.g. that is shared with the central processing unit (CPU)) of the overall data processing system.

Thus, in some embodiments, the display controller and/or data processing system comprises, and/or is in communication with, one or more memories and/or memory devices that store the data described herein, and/or store software for performing the processes described herein. The display controller and/or data processing system may also be in communication with and/or comprise a host microprocessor, and/or with and/or comprise a display for displaying images based on the data generated by the display controller.

Correspondingly, a further embodiment of the technology described herein comprises a data processing system comprising:
  a main memory;
  a display;
  one or more processing units operable to generate input surfaces for display and to store the input surfaces in the main memory; and a display controller, the display controller comprising:
an input stage operable to read plural input surfaces;
a composition stage operable to compose two or more read input surfaces to generate a composited surface comprising the two or more input surfaces; and
an output stage operable to provide an output surface for display to a display;
and the data processing system further comprising:
an image processing stage operable to perform a processing operation on a composited surface generated by the composition stage;
wherein:
the display controller further comprises processing circuitry configured to, when the display controller is generating a composited surface comprising two or more input surfaces, associate with the composited surface, data indicating a border between different input surfaces in the composited surface; and
the image processing stage comprises processing circuitry operable to, when the image processing stage is processing a composited surface, use information indicative of a border between two input surfaces in a composited surface to control the processing of the composited surface by the image processing stage.

As will be appreciated by those skilled in the art, these embodiments of the technology described herein can and in an embodiment do include one or more, and in an embodiment all, of the features of the technology described herein described herein.

In use of the display controller and data processing system of the technology described herein, one or more input surfaces will be generated, e.g., and in an embodiment, by a GPU, CPU and/or video codec, etc. and stored in memory. Those input surfaces will then be processed by the display controller to provide an output surface, e.g., and in an embodiment, for display.

The operation in the manner of the technology described herein is in an embodiment repeated for plural output surfaces generated by the display controller, e.g. output frames to be displayed, e.g., and in an embodiment, for a sequence of frames to be displayed.

The technology described herein can be implemented in any suitable system, such as a suitably configured microprocessor based system. In an embodiment, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, unless otherwise indicated, the various functional elements, stages, and "means" of the technology described herein may comprise a suitable processor or processors, controller or controllers, functional units, circuitry, processing logic, microprocessor arrangements, etc., that are operable to perform the various functions, etc., such as appropriately dedicated hardware elements and/or programmable hardware elements that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry, etc., if desired.

Furthermore, any one or more or all of the processing stages of the technology described herein may be embodied as processing stage circuitry, e.g., in the form of one or more fixed-function units (hardware) (processing circuitry), and/or in the form of programmable processing circuitry that can be programmed to perform the desired operation. Equally, any one or more of the processing stages and processing stage circuitry of the technology described herein may be provided as a separate circuit element to any one or more of the other processing stages or processing stage circuitry, and/or any one or more or all of the processing stages and processing stage circuitry may be at least partially formed of shared processing circuitry.

Subject to any hardware necessary to carry out the specific functions discussed above, the display controller can otherwise include any one or more or all of the usual functional units, etc., that display controllers include.

It will also be appreciated by those skilled in the art that all of the described embodiments of the technology described herein can, and in an embodiment do, include, as appropriate, any one or more or all of the features described herein.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a display controller, or microprocessor system comprising a data processor causes in conjunction with said data processor said controller or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory medium, such as a computer readable medium, for example, diskette, CD-ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

A number of embodiments of the technology described herein will now be described.

The present embodiments relate to the operation of a display controller in which one or more image processing operations are to be performed on a composited surface generated by a composition stage of the display controller from two or more input surfaces (layers).

The display controller may be used in a data processing system, e.g. of the form shown in FIG. 1.

Figure 2:
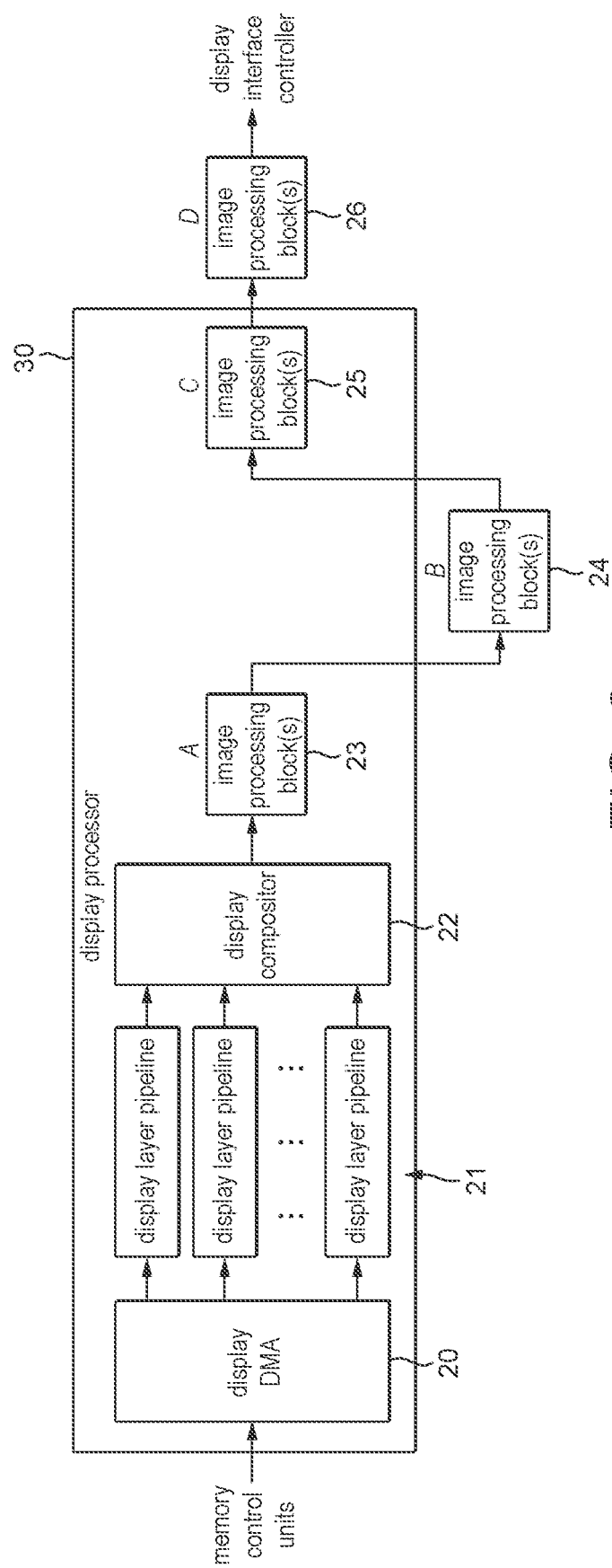
FIG. 2 shows schematically the data-flow in a display controller when processing input surfaces for display.
Figure 3:
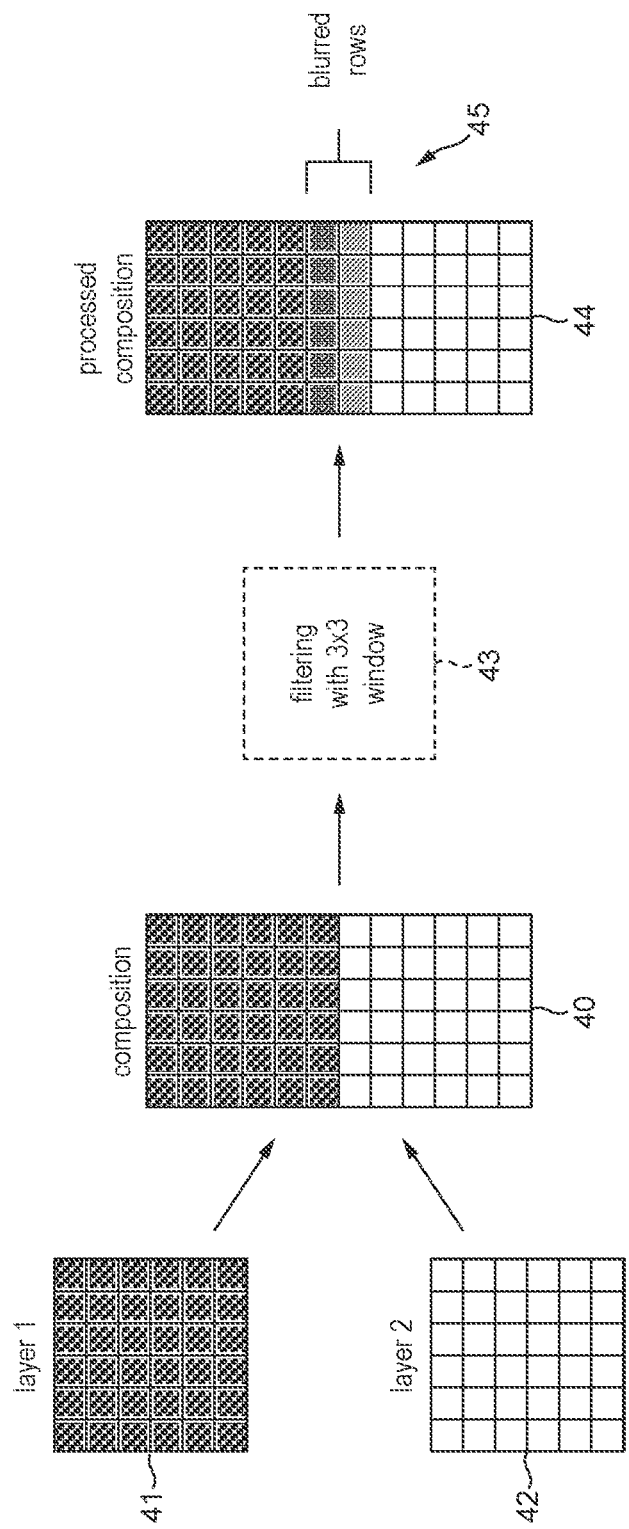
FIG. 3 shows schematically an image processing operation on a composited surface.

The present embodiments can be implemented in a display controller as shown, for example, in FIG. 2.

Figure 4:
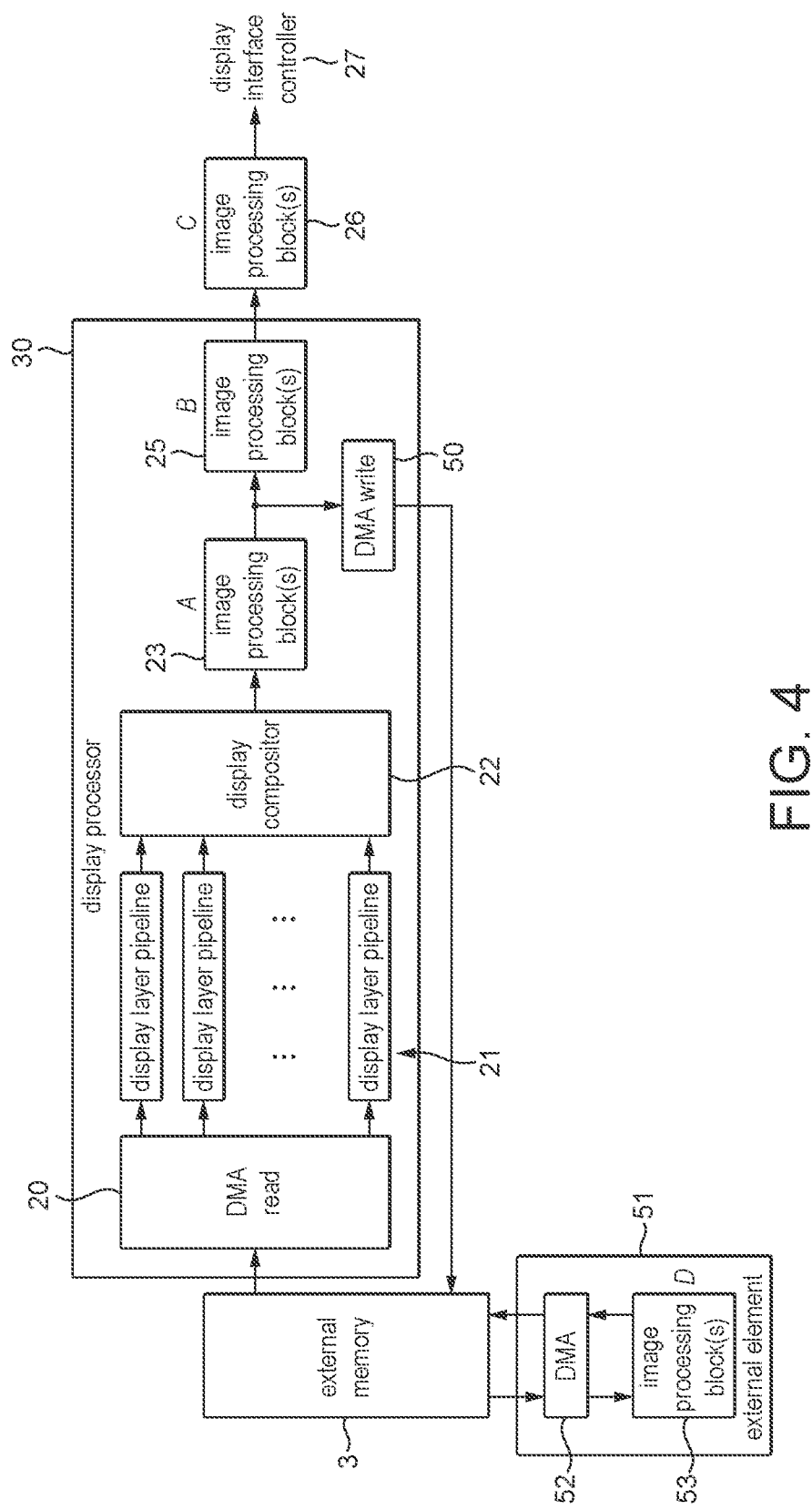
FIG. 4 shows schematically a display controller that can be operated in accordance with an embodiment of the technology described herein.

FIG. 4 shows another embodiment of a display controller that can be operated in the manner of the technology described herein.

For clarity purposes, FIGS. 2 and 4 show those elements and stages of the display controller and display processing pipeline that are relevant to the operation in the manner of the technology described herein and the present embodiments. As will be appreciated by those skilled in the art, the display controller and display processing pipeline may include any other suitable and desired stages and elements, e.g. that display controllers and display processing pipelines normally contain. Equally, the various elements and stages shown in FIGS. 2 and 4 may be implemented as desired, e.g. as appropriate processing circuitry (either programmable or fixed function). They may also share processing circuitry or be configured as independent circuit elements, as desired.

The display controller 30 shown in FIG. 4 is similar to the display controller shown in FIG. 2, but as shown in FIG. 4 further includes a memory write (DMA write) subsystem 50 that is operable to be able to write output surfaces generated by the composition stage 22 (and that may be subjected to image processing by the image processing block 23) to an external memory 3. Such output surfaces written to the external memory 3 can then be read by a further image processing element 51 that includes a memory read and write (DMA) subsystem 52 and an image processing block 53.

As discussed above, in the present embodiments the image processing blocks of the display controller may perform one or more image processing operations, such as scaling, sharpening, high dynamic range imaging, colour adjustment, image quality enhancement functions, such as brightness enhancement functions, compression, etc.

As shown in FIG. 4, the display controller's memory read subsystem 20 includes, inter alia, a read controller in the form of a Direct Memory Access (DMA) read controller, and is configured to read one or more input surfaces from one or more frame buffers in the main memory 3 via the memory bus 9.

The memory read subsystem 20 further comprises one or more real-time FIFO (first-in-first-out) modules which are used to buffer locally the one or more input surfaces as they are read from memory, e.g. for latency hiding purposes.

In this embodiment, the memory read subsystem 20 is configured to provide (read) three or more different input surfaces for use as input layers which are to be used to generate a composited output frame. The input layers may comprise one or more video layers, e.g. generated by the video processor (codec) 1, and one or more graphics layers, e.g. graphics windows generated by the graphics processing unit (GPU) 2, and so on. Hence, FIG. 4 shows the display controller 30 comprising plural layer pipelines 21 which will each receive data from an input surface to be used as a display layer. Any or all of the input surfaces received by the layer pipelines may have been subjected to decoding by a decoder and/or rotation by a rotation unit, if desired.

Each layer pipeline performs appropriate operations on the received surfaces, such as pixel unpacking from the received data words, colour (e.g. YUV to RGB) conversion, and inverse gamma or inverse sRGB correction.

Any number of layer pipelines may be provided and used in the present embodiments, e.g. depending on the application in question (and also depending on any silicon area constraints, etc.).

The display controller composition unit (display compositor) 22 receives inputs from the layer pipelines 21 and operates to compose the received input layers (surfaces) to generate a composited surface, e.g. by appropriate alpha blending operations, etc.

The layer processing pipelines 21 and the composition unit 22 together act as a processing stage of the display controller 30 that takes data of input surfaces read by the memory read subsystem 20 and produces from that data an output surface, e.g. for display.

The composited frames (surfaces) from the composition unit 22 are onwardly transmitted to image processing blocks 23, 25, 26, and/or to a memory write sub-system 50, as desired.

The (processed) composited frame is also transmitted for appropriate display on the associated display.

The (processed) composited frame may, for example, to subjected to colour conversion, dithering, and/or a gamma correction, if desired.

The (processed) composited frame may also be subjected to appropriate display timing functionality, e.g. so as to send pixel data to the display with, e.g., appropriate horizontal and vertical blanking periods. For example, horizontal and vertical synchronization pulses (HSYNC, VSYNC) may be generated together with a DATAEN signal which is asserted in non-blanking periods. In blanking periods DATAEN is de-asserted and no data is sent to the display (there are 4 blanking periods: horizontal front porch—before the HSYNC pulse, horizontal back porch—after the HSYNC pulse, vertical front porch—before the VSYNC pulse, and vertical back porch—after the VSYNC pulse).

It would also be possible to use other display timing and data (pixel) packing schemes, such as MIPI DPI, HDMI, Display Port, etc., if desired.

The display interface 27 may, e.g. interface with a local display of the data processing system (e.g. of the mobile device, smart phone, tablet, etc., that the data processing system is part of).

The memory write subsystem 50 of the display controller 30 is operable to write surfaces, e.g. generated by the composition unit 22, and/or from the layer pipelines 21, that it receives, out to external memory 3 (a frame buffer in external memory 3) via a memory bus. This then allows the display controller 30 to, as well as, e.g., providing output frames for display, also write those output frames to main memory, if desired. To facilitate this operation, the memory write subsystem 50 includes a DMA write controller, and comprises appropriate FIFOs to act as a local, latency hiding, buffer.

Output frames written out by the display controller 30 may then be used, e.g., by the GPU or video codec, for example.

As discussed above, when the display controller 30 is to provide an output frame for display, it will read in data of one or more input surfaces that have been generated, e.g., by video codec 1 and/or GPU 2, and which are stored in respective frame buffers in the main memory 3, to act as input layers in its output surface generation process, process that input surface data (e.g. by compositing it into an output frame) and provide the (composited) output frame to the display 4 for display.

This process is repeated for each frame that needs to be displayed, e.g. at a rate of 30 or 60 frames per second.

The present embodiments operate to determine for a composited surface generated by the composition stage 22 where edges (borders) between the different input surfaces (layers) making up the composited output surface are, and to provide "edge indicators" that are indicative of which pixel positions in the composited surface lie at the border between two input surface layers, which information is then used to control subsequent processing of the composited surface in the image processing blocks that process that surface.

Figure 5:
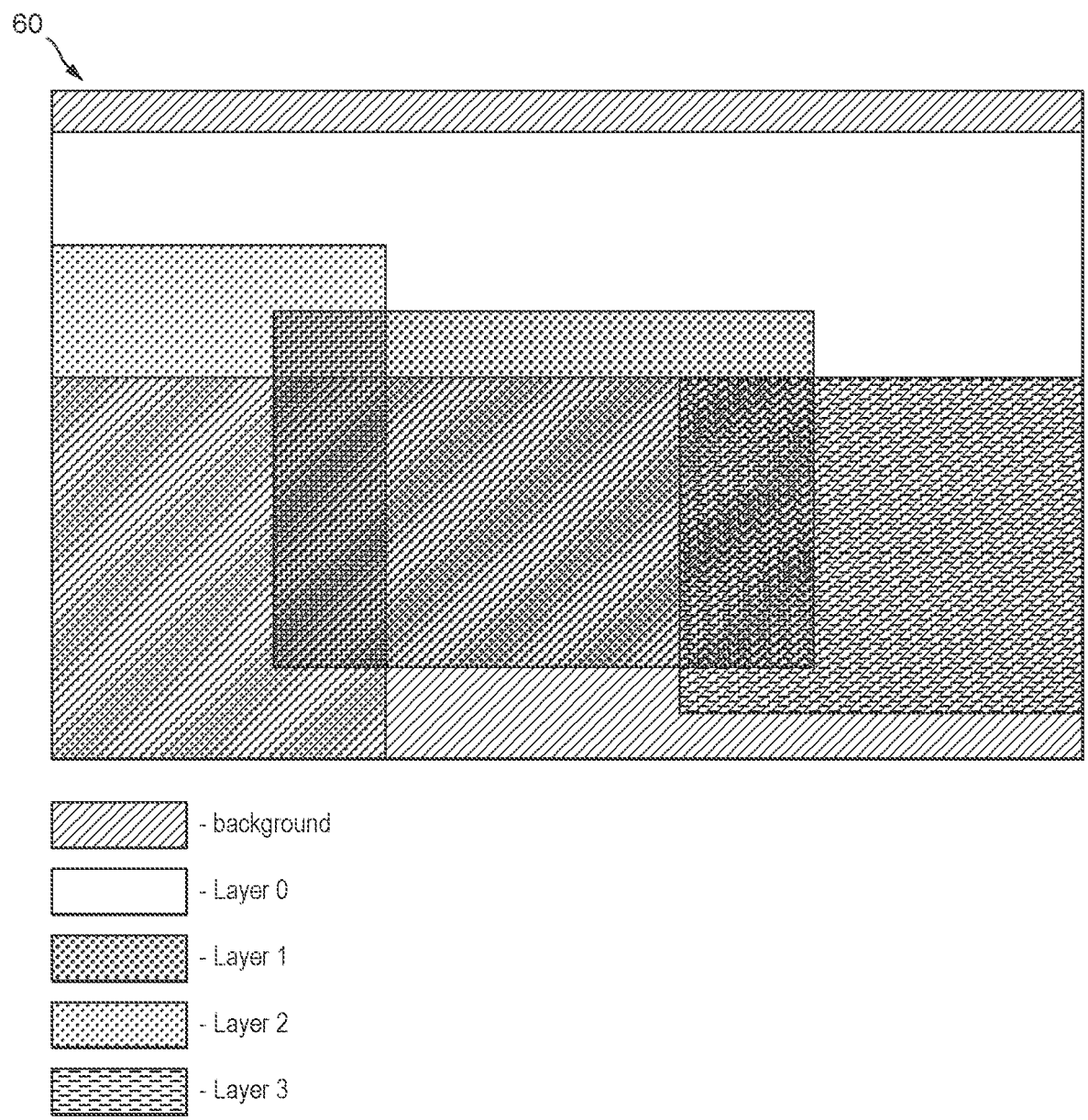
FIGS. 5 and 6 illustrate the operation of a display controller in an embodiment of the technology described herein.
Figure 6:
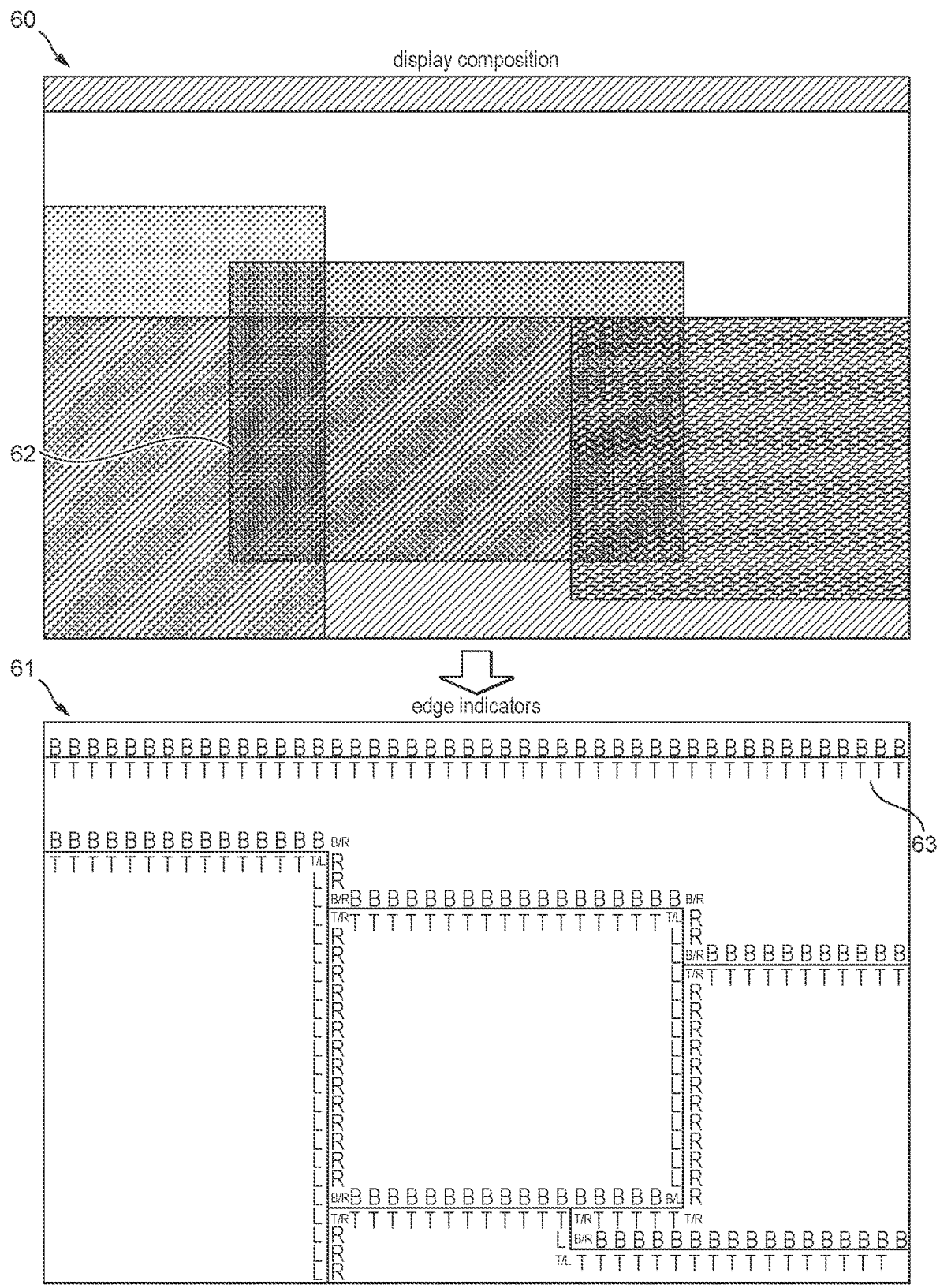

FIGS. 5 and 6 illustrate this operation.

FIG. 5 shows an exemplary composited output surface 60 that is composited from a background layer and four input layers.

FIG. 6 shows the corresponding array of edge indicator information 61 that is generated and associated with the composited surface 60. As can be seen from FIG. 6, for pixels in the composited surface 60 that lie at the edge of an input surface layer, such as the pixel 63, an indication of which edge the pixel position lies at is generated and stored. In the present embodiment each pixel position in the composited surface 60 has a corresponding 4-bit edge mask that is set to indicate which edge or edges (if any) (top, bottom, left, right) of an input surface layer the pixel position lies at.

As can also be seen from FIG. 6, in the present embodiments, not all of the edges between input surface layers are indicated as being edges in the edge indication information 61 that is stored for the composited surface 60.

In particular, in the present embodiments, an edge indication is only set for edges of the most visible input surface layer at any given input composited surface pixel position. Thus where a boundary between two input surface layers is covered by a more visible input surface layer, such as the boundary 62 shown in FIG. 6, that boundary is not denoted in the edge indicator information 61 for the composited output frame 60. Thus, borders between input surfaces (layers) that are covered by a more visible input surface (layer) are not recorded in the edge indicator information 61 for the composited surface 60. This then has the effect that the further processing of the most visible (and thus the most important) input layer in each region of the composited surface 60 will not be distorted by consideration of any borders between less visible input surfaces in that region of the composited surface 60.

In the present embodiments, the most visible input surface (layer) for any given pixel position in the composited surface 60 is determined based on the relative transparency (alpha) values for the input layers that cover that pixel position. The transparency (alpha) values may be, e.g., defined for each pixel position in an input surface (layer), or may be defined for a layer (surface) as a whole. The most visible input surface (layer) at a given pixel position is, in the present embodiments, determined as being the input layer that will provide the biggest contribution to the composited pixel in the composited surface.

Figure 7:
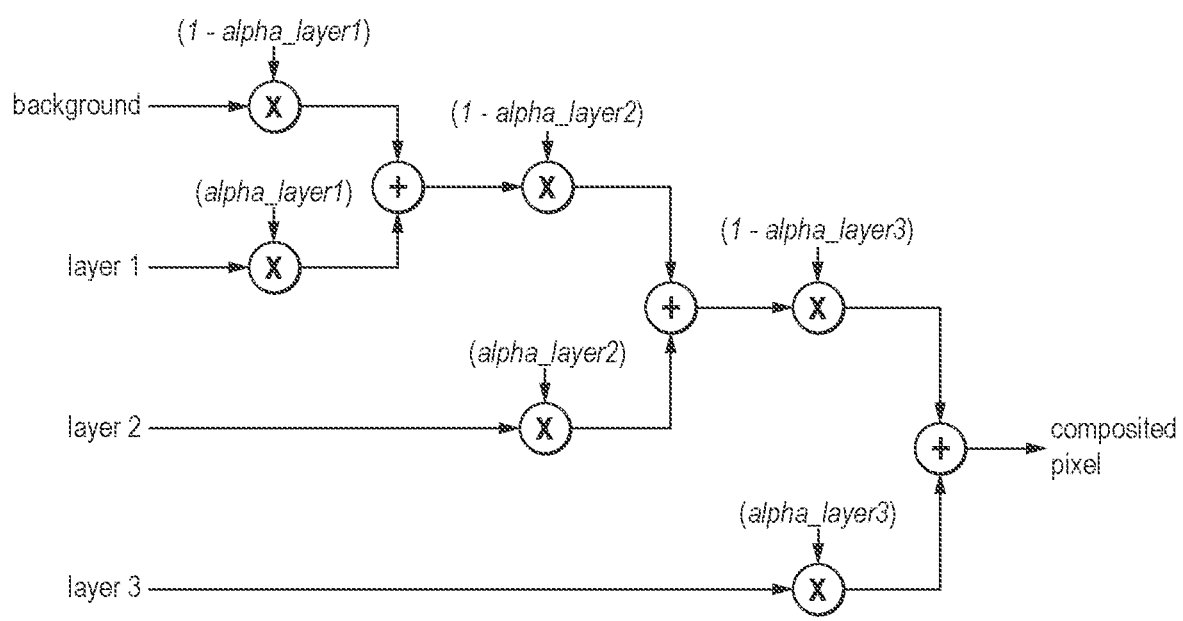
FIG. 7 shows schematically an alpha-blending process.

FIG. 7 illustrates the alpha blending process for three layer display composition at a given pixel position in a composited output surface. This arrangement can correspondingly be extended to any desired number of composited input surfaces.

In the present embodiment, the transparency (alpha) value for a given input surface (layer) that is used to determine the most visible input surface at a given pixel position is the effective transparency (alpha) value that represents the contribution of the input surface in question in the composited pixel. Thus in the example shown in FIG. 7, the effective transparency (alpha) value for each input layer is:

effective alpha value for layer 1=(1−alpha_layer3)× (1−alpha_layer2)×alpha_layer1 effective alpha value for layer 2=(1−alpha_layer3)× alpha_layer2; and effective alpha value for layer 3=alpha_layer3.

The input surface layer with the highest effective alpha value is then identified as being the most visible layer at the pixel position in question, and it is then determined whether that pixel position lies at the edge of that input surface layer or not (and the edge indicator mask for that pixel position is then set accordingly).

In the case where a composited surface is to be written out to external memory by the memory write subsystem 50, then any edge indicator information associated with that composited surface is in an embodiment also written out to the external memory 3, so that that information can then be used in association with the composited surface when the composited output surface is read from external memory for use. This may be repeated as desired, e.g., by the display controller again reading in the so-processed composited output surface from external memory and, e.g., using that surface as an input surface to generate a further composited output surface, etc. The edge indication information may be retained or discarded, e.g. depending upon the further processing that the surface is to undergo.

Figure 8:
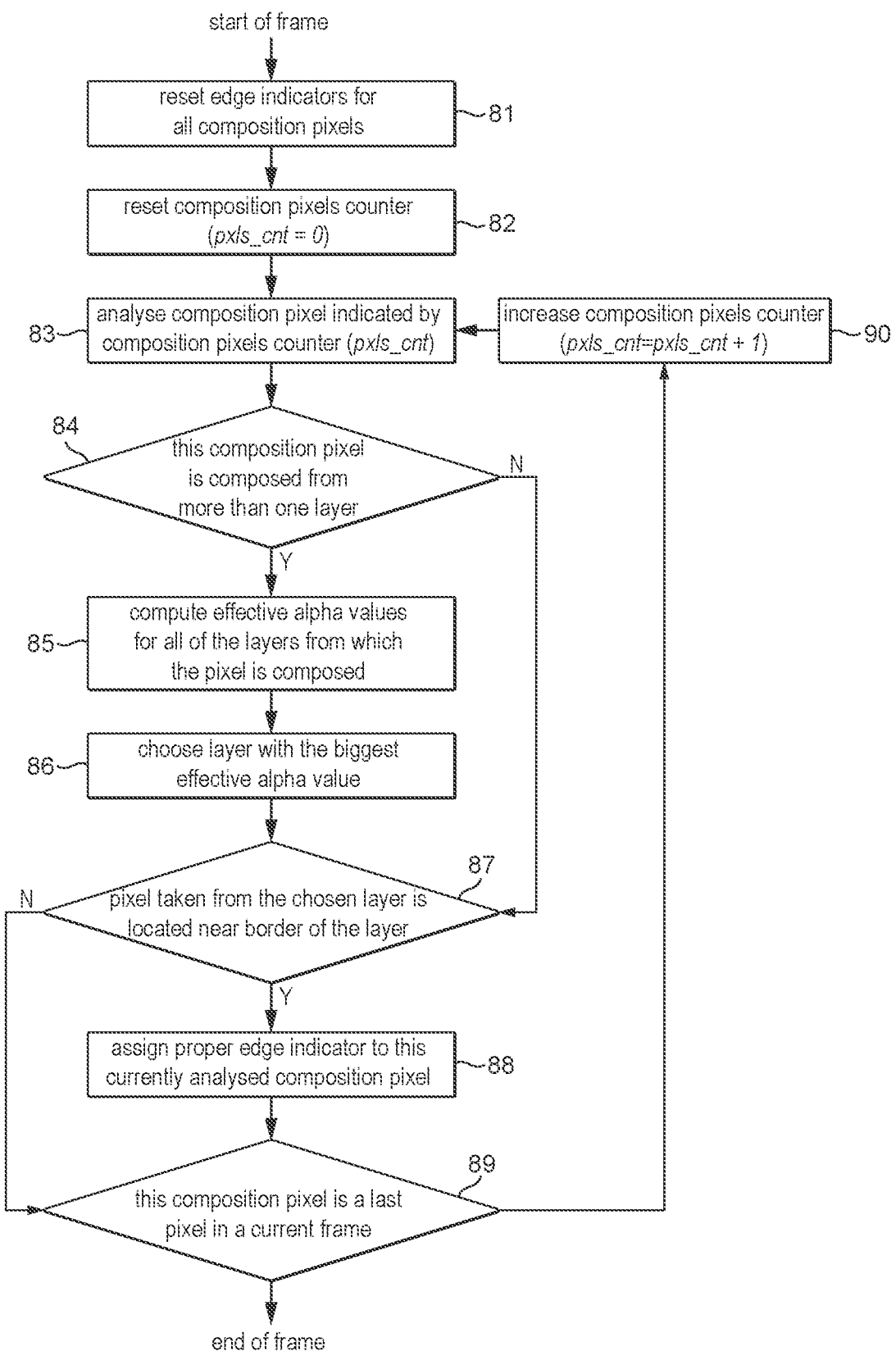
FIG. 8 is a flow chart showing the operation of a display controller in an embodiment of the technology described herein when generating a composited surface from two or more input surfaces.

FIG. 8 is a flowchart showing an embodiment of the above operation for determining the corresponding edge (border) indicating information for a composited surface.

As shown in FIG. 8, the process starts when a new composited surface is being generated. At this stage, the edge indicator for each pixel of the composited surface is cleared (reset) (step 81), as is the pixel counter that keeps track of which pixel in the composited surface (frame) is currently being considered (step 82).

The process then proceeds to determine for each pixel (data position) in the composited surface whether it lies at the edge of an (most visible) input surface (layer) or not, and sets the edge indicator information for the pixel (data position) accordingly.

As shown in FIG. 8, for the current pixel in the composited surface being considered (step 83) it is first determined whether that pixel in the composited surface is composed from more than one input layer (surface) (step 84).

If it is determined that the pixel being considered is composed from more than one input surface (layer), then the effective alpha values (as discussed above) are computed for all the layers from which the composition pixel is being composed (step 85) and the input layer with the largest effective alpha value is identified (step 86) (as discussed above).

It is then determined whether the pixel from the layer with the biggest effective alpha value at the pixel position being considered, or if the pixel position being considered is composed from only one layer, whether the pixel from that single layer, is located near the border of the layer in question (step 87). If the pixel is not near the border of the input layer in question, then the edge indicator for that pixel position in the composited output surface is left in its cleared (reset) state, thereby indicating that that pixel position is not (is not to be treated as being) located near the border (edge) of an input surface layer.

On the other hand, if the pixel is determined as being near the border (at the edge) of the input surface layer, then the edge indicator bit mask for that pixel position in the composited surface is set accordingly (step 88).

It is then determined whether the final pixel in the composited surface has been considered (step 89). If not, the operation returns to consider the next pixel in the composited surface (step 90). Otherwise, the process ends (and the next composited surface may be processed in the same way, and so on).

Once a composited surface has been generated, and corresponding edge indication information has been generated and stored for the composited surface, then, as discussed above, the composited surface may be subject to further image processing operations, such as compression, filtering, etc. In the present embodiments, these operations make use of the edge indicator information for the composited surface to selectively modify the input pixel processing window that is used for an image processing operation. In particular, the edge indication information is used in the present embodiments to ensure that any processing window (two dimensional array) of pixels in the composited surface that is used to generate an output pixel only contains pixels from the input layer that the output pixel position corresponds to. This then ensures that the processing window for the image processing operation does not contain pixels from more than one (and from an inappropriate) input layer in the composited surface.

To achieve this, the edge indicator information is used to determine whether there is a border between input surfaces in the composited surface in a processing window being considered, and in that case, any pixels from other input surfaces in the processing window are replaced with the nearest pixels that belong to the same input surface as the pixel position that the output is being generated for.

Figure 9:
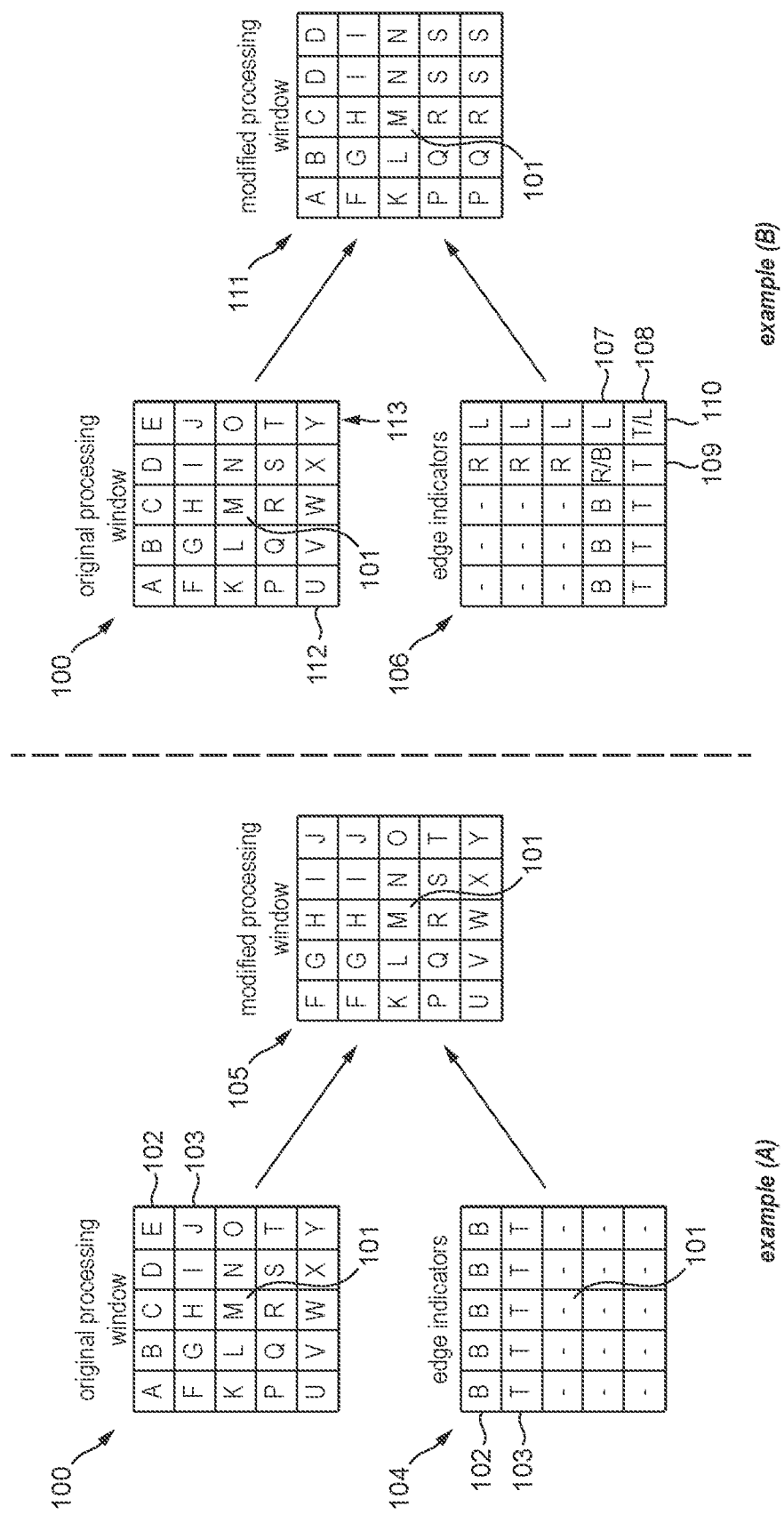
FIG. 9 shows schematically the operation of an image processing stage when processing a composited surface in an embodiment of the technology described herein.

FIG. 9 shows two examples of this operation for different edge arrangements in a processing window.

In FIG. 9, it is assumed that an image processing operation uses a 5×5 pixel processing window to generate an output value for the pixel position that is in the centre of the processing window.

Thus, as shown in FIG. 9 example (A), a 5×5 processing window of composited surface pixels 100 will be processed to generate an output pixel value for the central pixel position 101 (M).

In FIG. 9 example (A) it is assumed that there is an edge between two input layers lying between the top two rows 102 and 103 of the processing window 100. In this case, as shown in FIG. 9, in accordance with the indication of that edge from the edge indication information 104, the row of pixels 102 that belong to the input layer that is different to the central pixel position 101, are replaced by the pixel values for the row 103 that belong to the input layer of the central pixel position 101 to provide a modified processing window 105 that will then be used to generate the output value for the pixel position 101.

FIG. 9 example (B) shows an example in which there are two input surface borders (edges) passing through the processing window 100, a horizontal edge between the rows 107 and 108 and a vertical border (edge) between the columns 109 and 110.

In this case, as shown in FIG. 9, the bottom row 112 and the right-hand column 113 in the original processing window 100 that belong to different input surfaces to the central pixel position 101 are again replaced by the closest pixels that belong to the same input layer as the pixel position 101 that is being processed, to provide a modified processing window 111 that is then used to generate the output value for the pixel position 101.

FIG. 9 shows exemplary modifications of processing windows that can be performed in the present embodiments. Other modifications of the processing windows based on the edge indication information could be used if desired, for example to achieve desired effects, such as sharpening or smoothing at the borders between input surfaces in the composited surface.

FIG. 10 is a flowchart showing an embodiment for modifying a processing window being used to generate an output value for a pixel position from the pixels in a composited surface using border (edge) indication information.

Figure 11:
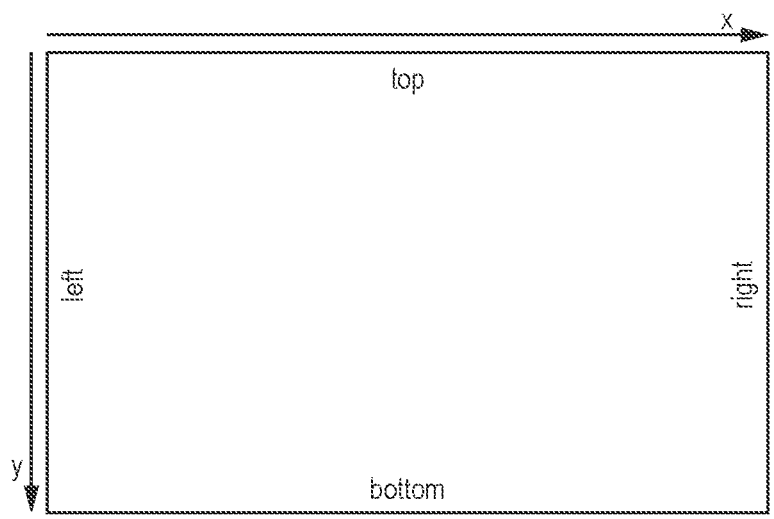
FIG. 11 shows the orientation of the surface axes and edges for the flow chart shown in FIGS. 10A and 10B.

In this Figure, it is assumed that the x and y axes and the top, bottom, left and right edges are oriented as shown in FIG. 11.

Figure 10A:
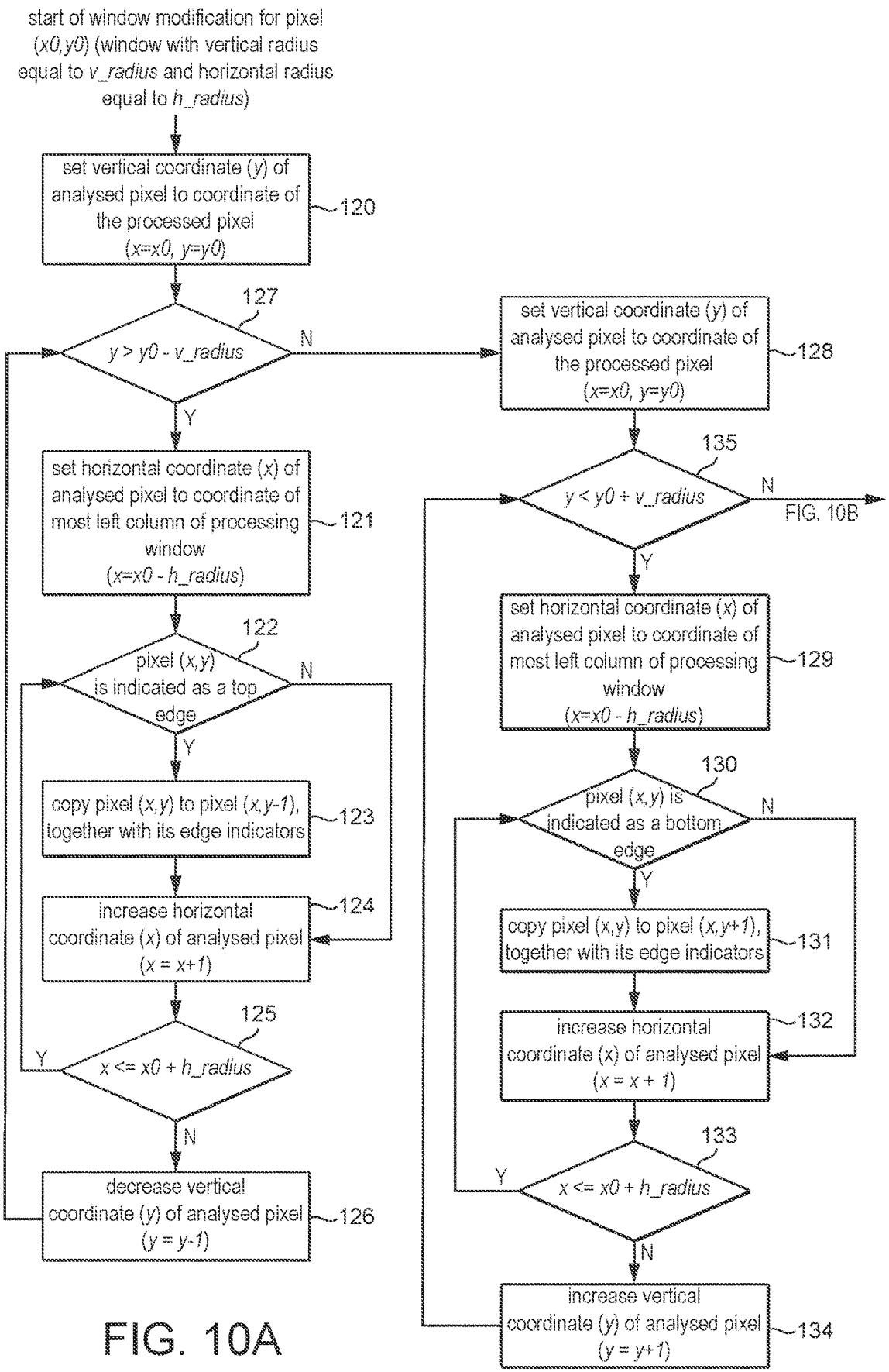
FIGS. 10A and 10B are a flow chart showing the operation of an image processing stage when processing a composited surface in an embodiment of the technology described herein.

As shown in FIG. 10A, for a processing window having a vertical radius v_radius and a horizontal radius h_radius around a pixel position (x0, y0) being processed (i.e. for which an output value is to be generated), it is determined for each pixel in that processing window whether it lies outside the edge of the input surface that the pixel for which the output is to be generated lies in, and, if so, that pixel (its data value) is replaced with (the data value for) the closest pixel in the input surface that the pixel being processed lies in.

As shown in FIG. 10A, this is done by considering each respective form of edge (top, bottom, left and right) that could be present in the processing window in turn.

Thus, as shown in FIG. 10A, firstly it is determined if the top edge of the input surface that the pixel position for which the output value is being generated falls within in the processing window above the pixel position for which the output value is being generated.

To do this, as shown in FIG. 10A, a pixel to be analysed is set to the pixel having the vertical coordinate of the pixel position for which the output value is being generated (step 120), and the horizontal coordinate of the left-most column of the processing window (step 121). It is then determined whether that pixel is indicated as being at the top edge of an input surface (step 122).

If so, the data value for that pixel is copied to the pixel position above that pixel position (as that higher pixel position will lie in a different input surface), together with its edge (border) indicators (step 123).

In either case, the process then moves to the next pixel position along the row in question (step 124) and the process is repeated until the end of the row in the processing window in question is reached (step 125).

This process is then repeated for the next row up in the processing window (step 126) until the row below the top row in the processing window has been reached (step 127).

The process then moves on to perform the corresponding operation to determine if the bottom edge of the input surface that the pixel position for which the output value is being generated falls within is in the processing window below the pixel position for which the output value is being generated.

To do this, as shown in FIG. 10A, the pixel to be analysed is set to the pixel having the vertical coordinate of the pixel position for which the output value is being generated (step 128), and the horizontal coordinate of the left-most column of the processing window (step 129). It is then determined whether that pixel is indicated as being at the bottom edge of an input surface (step 130).

If so, the data value for that pixel is copied to the pixel position below that pixel position, together with its edge (border) indicators (step 131).

In either case, the process then moves to the next pixel position along the row in question (step 132) and the process is repeated until the end of the row in the processing window in question is reached (step 133).

This process is then repeated for the next row down in the processing window (step 134) until the row above the bottom row in the processing window has been reached (step 135).

The process then moves on to perform the corresponding operation to determine if the left edge of the input surface that the pixel position for which the output value is being generated falls within lies in the processing window left of the pixel position for which the output value is being generated. This is shown in FIG. 10B.

Figure 10B:
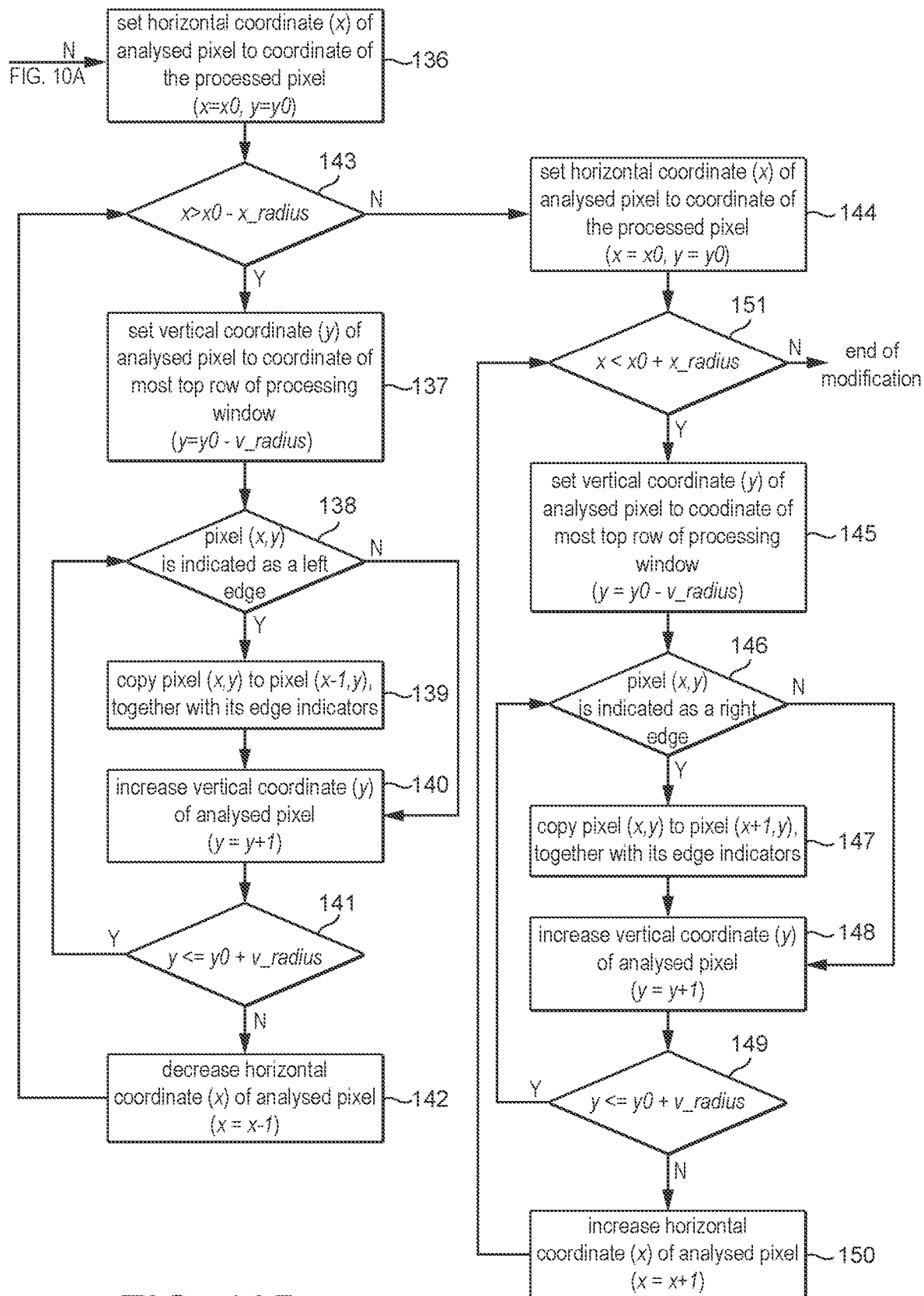

To do this, as shown in FIG. 10B, the pixel to be analysed is set to the horizontal coordinate of the pixel position for which the output value is being generated (step 136), and the vertical coordinate of the top row of the processing window (step 137). It is then determined whether that pixel is indicated as being at the left edge of an input surface (step 138).

If so, the data value for that pixel is copied to the pixel position to the left of that pixel position, together with its edge (border) indicators (step 139).

In either case, the process then moves to the next pixel position down the column in question (step 140) and the process is repeated until the bottom of the column in the processing window in question is reached (step 141).

This process is then repeated for the next column to the left in the processing window (step 142), until the column before the left-most column in the processing window has been reached (step 143).

The process then moves on to perform the corresponding operation to determine if the right edge of the input surface that the pixel position for which the output value is being generated falls within lies in the processing window right of the pixel position for which the output value is being generated.

To do this, as shown in FIG. 10B, the pixel to be analysed is set to the horizontal coordinate of the pixel position for which the output value is being generated (step 144), and the vertical coordinate of the top row of the processing window (step 145). It is then determined whether that pixel is indicated as being at the right edge of an input surface (step 146).

If so, the data value for that pixel is copied to the pixel position to the right of that pixel position, together with its edge (border) indicators (step 147).

In either case, the process then moves to the next pixel position down the column in question (step 148) and the process is repeated until the bottom of the column in the processing window in question is reached (step 149).

This process is then repeated for the next column to the right in the processing window (step 150), until the column before the right-most column in the processing window has been reached (step 151).

At this point, the processing window has been appropriately modified, and so can be used to generate the output value for the pixel position in question.

The process is then repeated for the next output pixel position, and so on, until the composited surface has been processed in the desired manner.

Various modifications, changes and alternatives and additions to the present embodiments and the technology described herein would be possible, if desired.

For example, while it would be possible for the border (edge) indicating information for a composited surface simply to be used by a single image processing block (stage) and then discarded, in an embodiment, the border (edge) indicating data is propagated with a composited surface through plural image processing blocks (stages) that are to process the composited surface (e.g. in turn), for example to and through each of the image processing blocks 23, 25, 26 and 53 shown in FIG. 4, with some or all of those image processing block (stages) then using the border indicating data appropriately to control their processing of the composited surface (of the version of the composited surface that they receive for processing).

It can be seen from the above that the technology described herein, in its embodiments at least, can provide improved operation when performing image processing operations on a surface that is composited from plural input surfaces. In particular, the technology described herein can help avoid any blur or bleeding between different input surface layers in a composited surface when performing subsequent window processing operations on the composited surface, and without the need, e.g., to perform complex edge detection operations, etc.

This is achieved, in the embodiments of the technology described herein at least, by recording in metadata associated with a composited surface information indicative of the borders between different input surfaces in the composited surface, which border information can then be used by subsequent image processing operations to identify borders between input surfaces in the composited surface.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A method of operating a data processing system, the data processing system comprising:

a display controller, the display controller comprising:

an input stage operable to read plural input surfaces;

a composition stage operable to compose two or more read input surfaces to generate a composited surface comprising the two or more input surfaces; and an output stage operable to provide an output surface for display to a display; and the data processing system further comprising:

an image processing stage operable to perform a processing operation on a composited surface generated by the composition stage;

the method comprising:

the input stage reading two or more input surfaces;

the composition stage combining the two or more input surfaces to generate a composited surface comprising a combination of the two or more input surfaces;

the composition stage identifying a border within the composited surface between different input surfaces of the two or more input surfaces that form the composited surface, and generating data indicative of the border;

the composition stage associating with the composited surface, the data indicative of the border within the composited surface between different input surfaces of the two or more input surfaces that form the composited surface;

providing to the image processing stage the composited surface and the data indicative of the border within the composited surface between different input surfaces of the two or more input surfaces that form the composited surface; and the image processing stage processing the composited surface and, when processing the composited surface, using the provided data indicative of the border within the composited surface between different input surfaces of the two or more input surfaces that form the composited surface to control the processing of the composited surface by the image processing stage.

2. The method of claim 1, wherein the processing operation performed by the image processing stage comprises one or more of: scaling, sharpening, high dynamic range imaging, colour adjustment, brightness enhancement functions, image quality enhancement functions, and compression of the composited surface.

3. The method of claim 1, comprising identifying the border within the composited surface between different input surfaces in the composited surface using information indicative of at least one of the size and position of the input surfaces in the composited surface that is provided to the display controller for the composition process.

4. The method of claim 1, comprising storing for each data position in the composited surface, a border information indicator, that indicates whether that data position is to be treated as lying at the border of an input surface or not.

5. The method of claim 1, comprising selecting the borders between input surfaces in the composited surface for which to generate and store border indicating data based on the transparency of the respective input surfaces in the composited surface.

6. The method of claim 1, comprising:

for at least one data position in the composited surface:

determining an input surface that provides the biggest contribution to the data position in the composited surface;

determining whether the data position in the composited surface lies at an edge of the determined input surface; and associating with the data position in the composited surface, border indication data indicating whether the data position was determined to lie at an edge of the determined input surface.

7. The method of claim 1, wherein the processing operation performed by the image processing stage uses data position values from a set of plural data positions in the composited surface to generate an output value for a data position in the composited surface; and the border indicating data is used to select the data positions in the composited surface to be used to generate an output value for a data position in the composited surface.

8. The method of claim 1, comprising, when processing the composited image by the image processing stage:

determining, using the border indication data associated with the composited surface, whether any data positions in a set of data positions in the composited surface to be used to generate an output data position value by the image processing operation lie in a different input surface of the two or more input surfaces that form the composited surface to the input surface that the data position for which the output value is being generated lies in;

and, when it is determined that the set of data positions includes a data position that lies in a different input surface to the input surface that the data position for which the output value is being generated lies in:

replacing the data value for the data position that lies in a different input surface, with a data value for a data position that lies in the input surface that the data position for which the output value is being generated lies in.

9. The method of claim 1, wherein:

the data processing system comprises plural image processing stages each operable to perform a processing operation on a composited surface; and the method further comprises:

propagating the border indicating data associated with a composited surface to plural of the plural image processing stages in association with the composited surface.

10. A data processing system comprising:

a display controller, the display controller comprising:

an input stage operable to read plural input surfaces;

a composition stage operable to combine two or more read input surfaces to generate a composited surface comprising a combination of the two or more input surfaces; and an output stage operable to provide an output surface for display to a display;

and the data processing system further comprising:

an image processing stage operable to perform a processing operation on a composited surface generated by the composition stage;

wherein:

the display controller further comprises processing circuitry configured to:

when the display controller is combining two or more input surfaces to generate a composited surface comprising the two or more input surfaces, identify a border within the composited surface between different input surfaces of the two or more input surfaces of the composited surface, and generate data indicative of the border;
associate with the composited surface, the data indicative of the border within the composited surface between different input surfaces of the two or more input surfaces that form the composited surface; and
provide to the image processing stage the composited surface and the data indicative of the border within the composited surface between different input surfaces of the two or more input surfaces that form the composited surface;
wherein the image processing stage comprises processing circuitry operable to, when the image processing stage is processing a composited surface, use data indicative of a border within the composited surface between two input surfaces in a composited surface to control the processing of the composited surface by the image processing stage.

11. The system of claim 10, wherein the processing operation performed by the image processing stage comprises one or more of: scaling, sharpening, high dynamic range imaging, colour adjustment, brightness enhancement functions, image quality enhancement functions, and compression of the composited surface.

12. The system of claim 10, wherein a border within the composited surface between different input surfaces in a composited surface is identified using information indicative of at least one of a size and position of the input surfaces in the composited surface that is provided to the display controller for the composition process.

13. The system of claim 10, wherein a border information indicator that indicates whether that data position is to be treated as lying at the border of an input surface or not, is stored for each data position in a composited surface.

14. The system of claim 10, wherein the display controller processing circuitry is configured to select borders between input surfaces in a composited surface for which to generate and store border indicating data based on the transparency of respective input surfaces in the composited surface.

15. The system of claim 10, wherein the display controller processing circuitry is configured to:
for at least one data position in a composited surface:
determine an input surface that provides a biggest contribution to the data position in the composited surface;
determine whether the data position in the composited surface lies at an edge of the determined input surface; and
associate with the data position in the composited surface, border indication data indicating whether the data position was determined to lie at an edge of the determined input surface.

16. The system of claim 10, wherein the processing operation performed by the image processing stage uses data position values from a set of plural data positions in a composited surface to generate an output value for a data position in a composited surface; and
the image processing stage processing circuitry is operable to use the border indicating data to select data positions in a composited surface being processed to be used to generate an output value for a data position in the composited surface.

17. The system of claim 10, wherein the image processing stage processing circuitry is operable to:
determine, using border indication data associated with a composited surface, whether any data positions in a set of data positions in the composited surface to be used to generate an output data position value by the image processing operation lie in a different input surface of the two or more input surfaces that form the composited surface to the input surface that the data position for which the output value is being generated lies in;
and, when it is determined that the set of data positions includes a data position that lies in a different input surface to the input surface that the data position for which the output value is being generated lies in:
replace the data value for the data position that lies in a different input surface, with a data value for a data position that lies in the input surface that the data position for which the output value is being generated lies in.

18. The system of claim 10, comprising:
plural image processing stages each operable to perform a processing operation on a composited surface;
and wherein:
the border indicating data associated with a composited surface is propagated to plural of the plural image processing stages in association with the composited surface.

19. A display controller for a data processing system, the display controller comprising:
an input stage operable to read plural input surfaces;
a composition stage operable to combine two or more read input surfaces to generate a composited surface comprising a combination of the two or more input surfaces; and
an output stage operable to provide an output surface for display to a display;
wherein:
the display controller further comprises processing circuitry configured to:
when the display controller is compositing two or more input surfaces to generate a composited surface comprising the two or more input surfaces, identify a border within the composited surface between different input surfaces of the two or more input surfaces of the composited surface, and generate data indicative of the border; and
associate with the composited surface, the data indicative of the border within the composited surface between different input surfaces of the two or more input surfaces that form the composited surface.

20. The display controller of claim 19, further comprising:
an image processing stage operable to perform a processing operation on a composited surface generated by the composition stage;
wherein:
the image processing stage comprises processing circuitry operable to, when the image processing stage is processing a composited surface, use information indicative of a border within the composited surface between two input surfaces in a composited surface to control the processing of the composited surface by the image processing stage.

21. A non-transitory computer readable storage medium storing computer software code which when executing on a processor performs a method of operating a data processing system, the data processing system comprising:

a display controller, the display controller comprising: an input stage operable to read plural input surfaces;
a composition stage operable to compose two or more read input surfaces to generate a composited surface comprising the two or more input surfaces; and an output stage operable to provide an output surface for display to a display; and the data processing system further comprising:
an image processing stage operable to perform a processing operation on a composited surface generated by the composition stage;
the method comprising:
the input stage reading two or more input surfaces;
the composition stage compositing combining the two or more input surfaces to generate a composited surface comprising a combination of the two or more input surfaces:
the composition stage identifying a border within the composited surface between different input surfaces of the two or more input surfaces that form the composited surface, and generating data indicative of the border;
the composition stage associating with the composited surface, the data indicative of the border within the composited surface between different input surfaces that form the composited surface; and
providing to the image processing stage the composited surface and the data indicative of the border within the composited surface between different input surfaces of the two or more input surfaces that form the composited surface; and
the image processing stage processing the composited surface and, when processing the composited surface, using the provided data indicative of the border within the composited surface between different input surfaces of the two or more input surfaces that form the composited surface to control the processing of the composited surface by the image processing stage.

* * * * *